United States Patent [19]
Amberg et al.

[11] Patent Number: 5,937,130
[45] Date of Patent: Aug. 10, 1999

[54] METHOD AND APPARATUS FOR INSTALLING FIBER OPTIC JUMPER CABLES IN AN EQUIPMENT ENCLOSURE

[76] Inventors: Mark F. Amberg, 7677 S. Pennsylvania Dr., Littleton, Colo. 80122; Robert Leonard Bryant, Jr., 1908 Longs Peak St., Erie, Colo. 80516; Charles R. Lindemulder, 11615 Quivas Way, Denver, Colo. 80234

[21] Appl. No.: 09/063,164

[22] Filed: Apr. 20, 1998

[51] Int. Cl.⁶ .................................................. G02B 6/00
[52] U.S. Cl. ........................... 385/134; 385/135; 385/139
[58] Field of Search .................................. 385/134, 135, 385/136, 137, 138, 139

[56] References Cited

U.S. PATENT DOCUMENTS

5,774,618  6/1998  Jones ......................................... 385/135
5,778,130  7/1998  Walters et al. ........................... 385/134

*Primary Examiner*—Phan T. H. Palmer
*Attorney, Agent, or Firm*—Duft, Graziano & Forest, P.C.; James M. Graziano, Esq.

[57] ABSTRACT

The present method and apparatus for installing fiber optic jumper cables in an equipment enclosure enables the simple installation of fiber optic jumper cables in an equipment enclosure that is provisioned with traditional wire jumper cables and connectors. This apparatus includes a fiber optic pass through tool that enables the craftsperson to thread the fiber optic jumper cables through the equipment enclosure with minimal effort and avoids damage to the fiber optic jumper cable. The fiber optic pass through tool comprises two parts: an extender and a hybrid fiber optic coupling adapter. The extender provides the craftsperson with sufficient reach to pull the fiber optic jumper cable through the entire length of the equipment enclosure, with sufficient flexibility to bend the tool around corners, and yet with sufficient stiffness to control the passage of the tool through the equipment enclosure. A hybrid fiber optic coupling adapter is attached in a snap fit manner to the extender and provides a secure means of connecting the fiber optic jumper cable to the extender without the need for fasteners. The fiber optic jumper cable can then be pulled back through the equipment enclosure to the front of the fiber optic circuit pack using the fiber optic pass through tool. The hybrid fiber optic coupling adapter is then disconnected from the handle, mounted on the equipment enclosure bulkhead and used to terminate the fiber optic jumper cable.

10 Claims, 8 Drawing Sheets

METHOD AND APPARATUS FOR INSTALLING FIBER OPTIC JUMPER CABLES IN AN EQUIPMENT ENCLOSURE

FIELD OF THE INVENTION

This invention relates to fiber optic cable interconnect devices and in particular to a method and apparatus that enables the simple installation of fiber optic jumper cables in an equipment cabinet that is provisioned with traditional wire jumper cables and connectors.

PROBLEM

It is a problem in the field of electronic equipment that is installed in a cabinet enclosure and terminated by wired connectors to retrofit fiber optic capabilities to this system in an inexpensive and simple manner. It is a standard architecture in electronic equipment, such as telecommunications, data processing and data storage systems, to interconnect a plurality of circuit packs via a connectorized backplane. The backplane spans the length of a carrier that receives a plurality of circuit packs and includes a connector for each of the plurality of circuit packs. In this manner, the placement of a circuit pack in a designated position or slot in the carrier interconnects the circuit pack with the backplane and thence with the remaining circuit packs in the carrier via the wiring implemented on the backplane. The connection of each circuit pack to external equipment is done through connectors that are mounted in a rear bulkhead of the system enclosure. The bulkhead connectors form one end of a jumper cable, the other end of which is terminated on the backplane and thence to the circuit pack by the backplane connector for that circuit pack. Thus, the circuit boards that are installed in the enclosure are connected by the backplane connector to both the bulkhead connector and the other circuit boards in the carrier.

Equipment that uses this architecture is typically implemented using wire cables, such as ribbon cables, and does not support fiber optic connections through the backplane or bulkhead. Any circuit boards that support fiber optic connectors must therefore have their fiber optic connectors mounted on the front bezel of the circuit pack, since the back side of the fiber optic circuit pack interfaces with the backplane. The interconnection of the fiber optic circuit pack with the external equipment must therefore be done by means of a fiber optic jumper cable that is routed from the front side of the fiber optic circuit pack, through the system enclosure, to the bulkhead. The fiber optic jumper cable must therefore be routed around the other circuit packs and the backplane to the rear of the enclosure where it must somehow be secured in place and terminated in a fiber optic cable connector.

The routing of a fiber optic jumper cables is this environment creates two problems. The first problem relates to how the fiber optic jumper cable can be routed through the limited available space in the enclosure and its contents in a simple manner without requiring extensive installation time or expensive tools. The second problem relates to how the fiber optic jumper cable connector is secured to the rear of the enclosure so that the fiber optic jumper cable can be interconnected with a cross connect field or other communication cable.

Solution

The above described problems are solved and a technical advance achieved by the present method and apparatus that enables the simple installation of fiber optic jumper cables in an equipment enclosure that is provisioned with traditional wire jumper cables and connectors. This apparatus includes a fiber optic pass through tool that enables the craftsperson to thread the fiber optic jumper cables through the equipment enclosure with minimal effort and avoids damage to the fiber optic jumper cable. The fiber optic pass through tool comprises two parts: and extender/handle and a hybrid fiber optic coupling adapter. The extender/handle provides the craftsperson with sufficient reach to pull the fiber optic jumper cable through the entire length of the equipment enclosure, with sufficient flexibility to bend the tool around corners, and yet with sufficient stiffness to control the passage of the tool through the equipment enclosure. A hybrid fiber optic coupling adapter is attached in a snap fit manner to the extender/handle and provides a secure means of connecting the fiber optic jumper cable to the extender/handle without the need for fasteners once the fiber optic pass through tool has been threaded through the equipment enclosure. The fiber optic jumper cable can then be pulled back through the equipment enclosure to the front of the fiber optic circuit pack using the fiber optic pass through tool.

In addition to the above method of threading the fiber optic jumper cable through the equipment enclosure, a method and apparatus for terminating the fiber optic jumper cable on the equipment enclosure bulkhead is also provided. Existing equipment enclosures typically are equipped with a bulkhead, located at the rear of the equipment enclosure, that contains headers for the physical mounting of the jumper cables so that the cables that connect the equipment with a cross connect field or other communication cables are provided with a secure means of fastening to the jumper cables. For example, 25 pair ribbon cable connectors are typically used for this purpose. Each header is secured into an appropriately sized and shaped hole that is formed in the bulkhead and a 25 pair ribbon cable connector mounted in the header and wired to a corresponding one of the circuit packs via the backplane. however, any fiber optic circuit pack that is used in the equipment enclosure is equipped with a fiber optic connector, and the corresponding bulkhead 25 pair ribbon cable connector is unused. This unused 25 pair ribbon cable connector and its corresponding header can be removed from the bulkhead and an adapter plate used to convert the opening in the bulkhead for use with the appropriate hybrid fiber optic coupling adapter. An adapter plate is provided for this purpose and snaps into the header opening to accept an SC to SC, SC to ST or SC to FC hybrid fiber optic coupling adapter. This enables the use of a fiber optic cable connector that is located in the equipment enclosure bulkhead.

DETAILED DESCRIPTION

Physical Architecture of Typical Electronic Equipment

Figure 2:
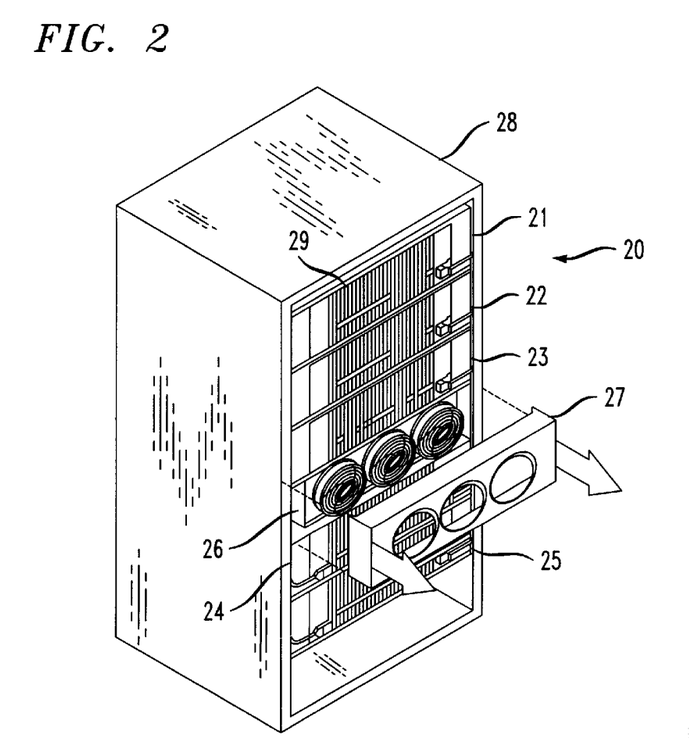
FIG. 2 illustrates a front perspective view of a typical equipment enclosure with the front cover removed therefrom.

It is a problem in the field of electronic equipment that is installed in a cabinet-type of equipment enclosure and terminated by wired cable connectors to retrofit fiber optic capabilities to this system in an inexpensive and simple manner. FIG. 2 illustrates a front perspective view of a typical electronic equipment 20 that is installed in an equipment enclosure 28 with the front cover (not shown) removed therefrom. A plurality of carriers 21–25 are installed in the equipment enclosure 28, each of which houses a plurality of circuit packs 29. Included in the equipment enclosure 28 is a set of cooling fans 26, that may also be mounted in their own carrier. The carriers 21–25 are stacked in a vertical orientation to provide an efficient manner of housing and interconnecting the plurality of circuit packs 29 that comprise the electronic equipment 20.

Figure 3:
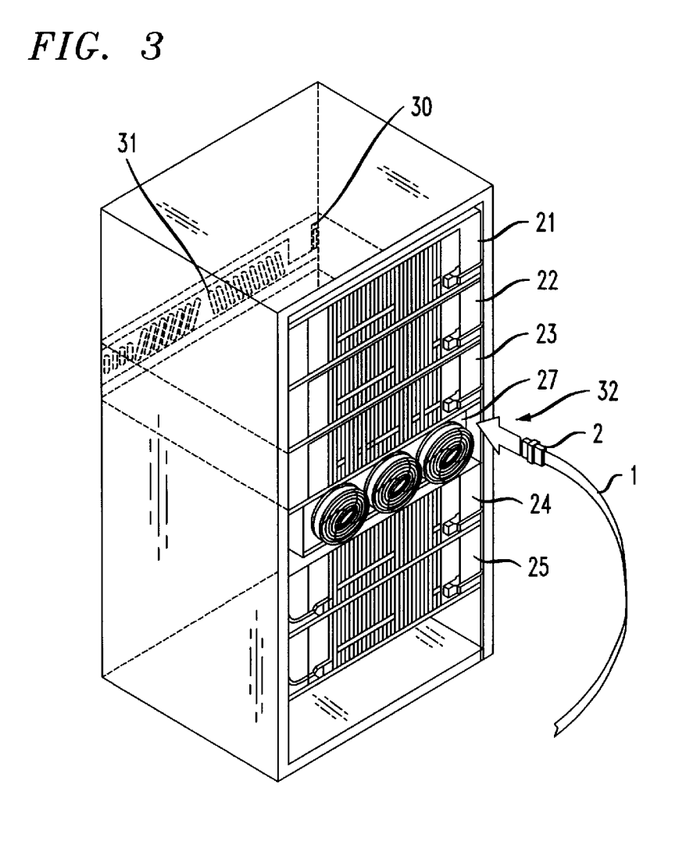
FIG. 3 illustrates a front perspective view of a typical equipment enclosure with the front cover removed therefrom, showing the insertion of the fiber optic pass through tool therein.

This is a standard architecture in electronic equipment, such as telecommunications, data processing and data storage systems, to interconnect a plurality of circuit packs via a connectorized backplane. The backplane (not shown) spans the length of a carrier 23 that receives a plurality of circuit packs 29 and the backplane includes a connector located at each circuit pack slot for interconnecting with a corresponding one of the plurality of circuit packs 29. In this manner, the placement of a circuit pack in a designated position or slot in the carrier 23 interconnects the circuit pack 29 with the backplane and thence with the remaining circuit packs in the carrier 23 via the wiring implemented on the backplane. The connection of each circuit pack 29 to external equipment is done through connectors 31 that are mounted in a rear bulkhead 30 of the equipment enclosure 28 (FIG. 3). The bulkhead connectors 31 form one end of a jumper cable (not shown), the other end of which is terminated on the backplane and thence to the circuit pack 29 by the backplane connector for that circuit pack 29. Thus, the circuit packs 29 that are installed in the equipment enclosure 28 are connected by the backplane connector to both the bulkhead connector 31 and the other circuit packs in the carrier 23.

Apparatus for Installing Fiber Optic Jumper Cables in an Equipment Cabinet

Figure 1:
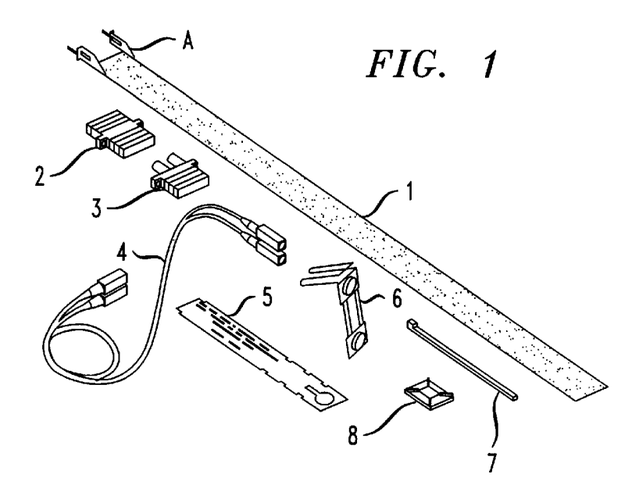
FIG. 1 illustrates a perspective view of the apparatus that is used in the present method and apparatus for installing fiber optic jumper cables in an equipment enclosure.

FIG. 1 illustrates a perspective view of the apparatus that is used in the present method and apparatus for installing fiber optic jumper cables in an equipment enclosure. The present apparatus for installing fiber optic jumper cables in an equipment enclosure enables the simple installation of fiber optic jumper cables 4 in an equipment enclosure 28, that is provisioned with traditional wire jumper cables and connectors. The apparatus includes a fiber optic pass through tool that enables the craftsperson to thread the fiber optic jumper cables through the equipment enclosure 28 with minimal effort and avoids damage to the fiber optic jumper cable 4. The fiber optic pass through tool comprises two parts: and extender/handle 1 and a hybrid fiber optic coupling adapter 2, 3. Two hybrid fiber optic coupling adapters 2, 3 are provided to enable the craftsperson to use either SC or ST connectors to terminate the fiber optic jumper cable 4. In addition, an adapter plate 6, cable ties 7, cable tie mounts 8 and connector label 5 are provided for use in securing the fiber optic jumper cable 4 in place as is described below.

The fiber optic pass through tool is assembled by the interconnection of the extender 1 with a selected one of the hybrid fiber optic coupling adapters 2, 3 hybrid fiber optic coupling adapters 2, 3. The extender/handle 1 provides the craftsperson with sufficient reach to pull the fiber optic jumper cable 4 through the entire length of the equipment enclosure 28, with sufficient flexibility to bend the fiber optic pass through tool around corners, and yet with sufficient stiffness to control the passage of the fiber optic pass through tool through the equipment enclosure 28 to a desired location at the back of the equipment enclosure 28, in the direction shown by the arrow on FIG. 5A. The fiber optic pass through tool enables the craftsperson to thread the fiber optic jumper cable 4 through a desired path in a simple manner without the craftsperson having to expend a significant amount of time to accomplish the jumper cable placement. A selected one of the hybrid fiber optic coupling adapters 2, 3 is attached in a snap fit manner to one end of the extender/handle 1 by means of a hybrid fiber optic coupling adapter receiver A that provides a secure means of connecting the one of the hybrid fiber optic coupling adapters 2, 3 to the extender/handle 1 without the need for fasteners. The fiber optic jumper cable 4 is connected to the one of the hybrid fiber optic coupling adapters 2, 3 and can then be pulled back through the equipment enclosure 28 to the front of the fiber optic circuit pack 61, in the direction shown by the arrow on FIG. 6, using the fiber optic pass through tool. Once the fiber optic jumper cable 4 is pulled back through the equipment enclosure 28, the selected one of the hybrid fiber optic coupling adapters 2, 3 is disconnected from the extender 1 and the fiber optic jumper cable 4 and is used as a connector in the bulkhead 30 as described below.

In addition to the above method of threading the fiber optic jumper cable 4 through the equipment enclosure 28, a method and apparatus for terminating the fiber optic jumper cable 4 on the bulkhead 30 is also provided. Existing equipment enclosures 28 typically are equipped with a bulkhead 30 that contains headers 51 for the physical mounting of the jumper cables so that the cables that connect the equipment with a cross connect field or other communication cables are provided with a secure means of fastening to the jumper cables. For example, 25 pair ribbon cable connectors are typically used for this purpose. Each header 51 is secured into an appropriately sized and shaped hole that is formed in the bulkhead 30 and a 25 pair ribbon cable connector mounted in the header 51 and wired to a corresponding one of the circuit packs via the backplane. However, any fiber optic circuit pack that is used in the equipment enclosure 28 is equipped with a fiber optic connector 63, and the corresponding bulkhead 25 pair ribbon cable connector is unused. This unused 25 pair ribbon cable connector and its corresponding header 51 can be removed from the bulkhead 30 and an adapter plate 5 used to convert the opening in the bulkhead 30 for use with the appropriate hybrid fiber optic coupling adapter 2, 3. An adapter plate 6 is provided for this purpose and snaps into the header opening to accept an SC to SC, SC to ST or SC to FC hybrid fiber optic coupling adapter 2, 3 which serves as the termination for the fiber optic jumper cable 4.

Method of Installing Fiber Optic Jumper Cables in an Equipment Enclosure

Figure 6:
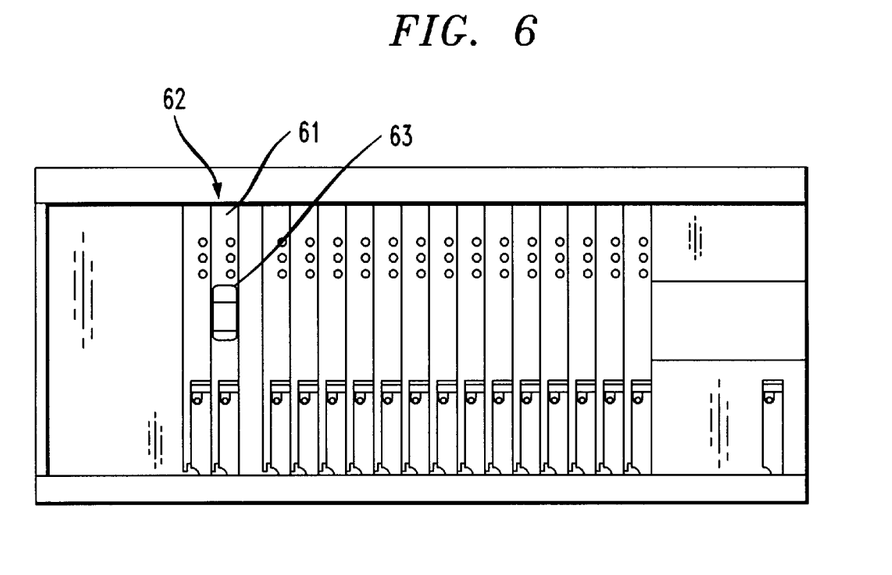
FIG. 6 and FIG. 7 illustrate front plan and side cross-section views of a typical circuit pack carrier and a fiber optic circuit pack mounted therein, showing the insertion of the fiber optic jumper cable therein.
Figure 10A:
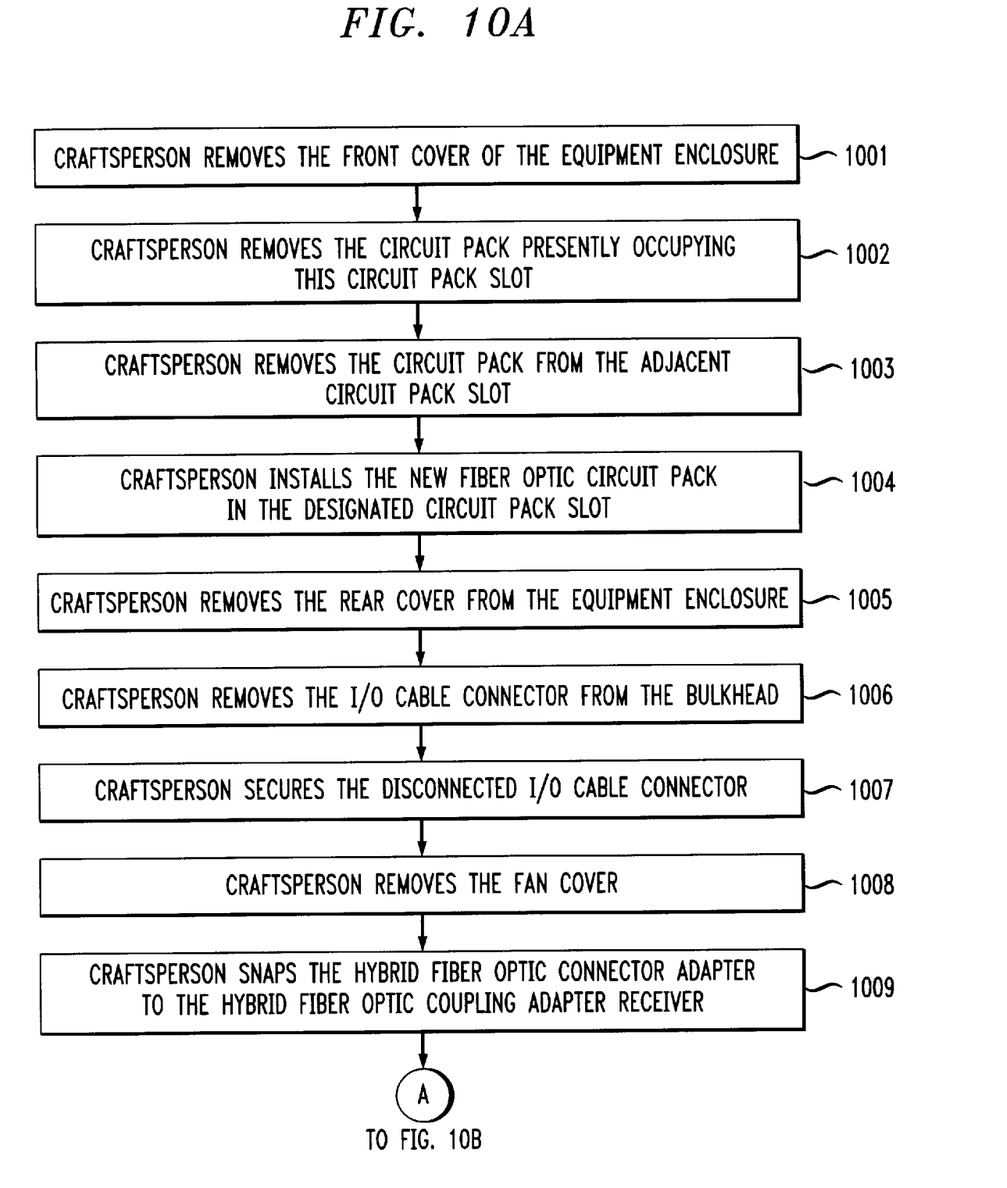
FIGS. 10A and 10B illustrate in flow diagram form the steps taken to perform the present method for installing fiber optic jumper cables in an equipment cabinet.
Figure 10B:
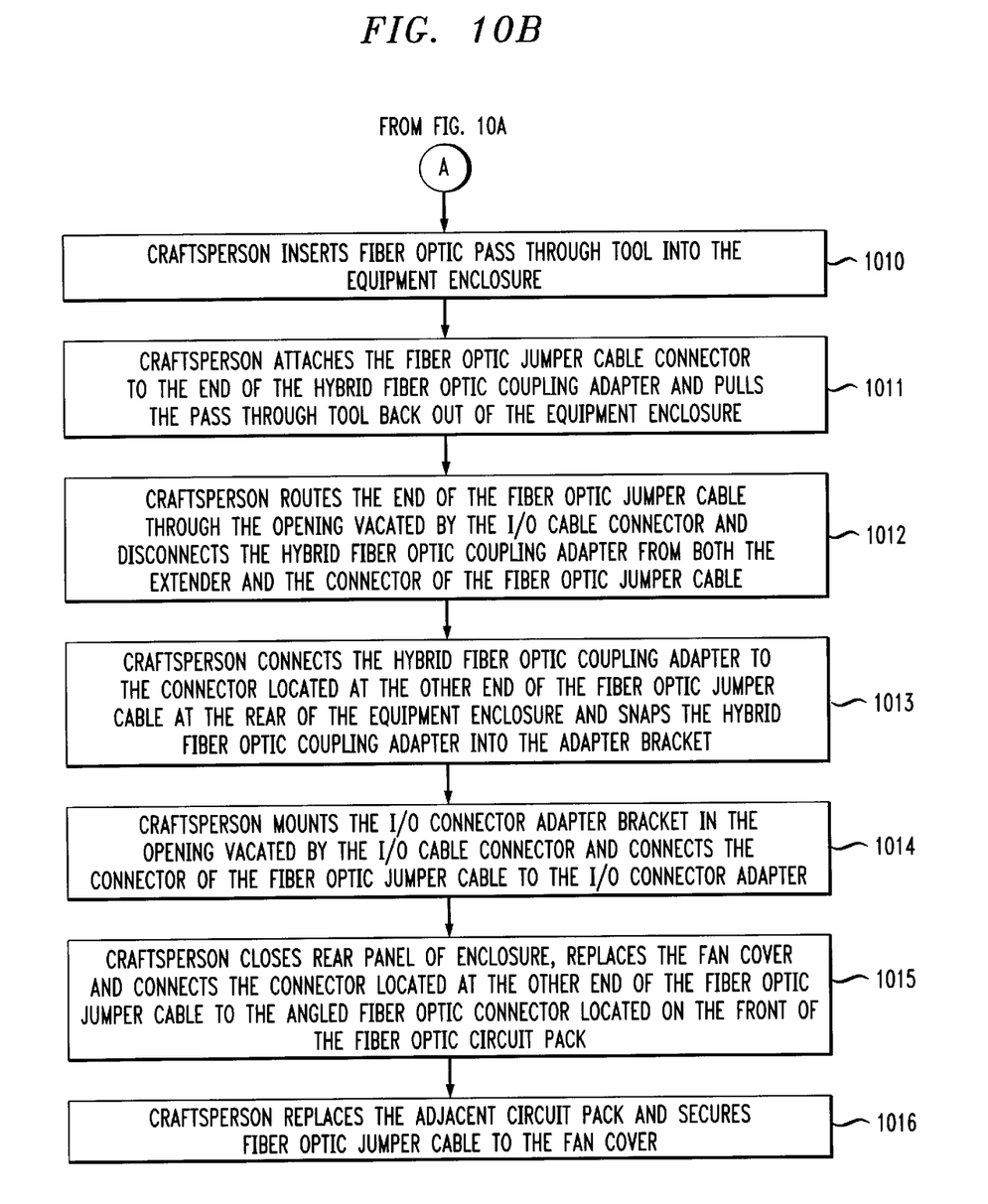

FIGS. 10A and 10B illustrate, in flow diagram form, the steps taken to perform the present method for installing fiber optic jumper cables in an equipment enclosure. At step 1001, the craftsperson opens front door or removes the front cover of the equipment enclosure 28 and determines which circuit pack slot 62 is designated for use by the fiber optic circuit pack 61 (FIG. 6). The craftsperson then at step 1002 removes the circuit pack presently occupying this circuit pack slot 62 or the blanking plate the blocks this circuit pack slot 62. At step 1003, the craftsperson removes the circuit pack from the adjacent circuit pack slot to provide additional room to perform the installation of the fiber optic circuit pack 61 and its associated fiber optic jumper cable 4. The craftsperson at step 1004 installs the new fiber optic circuit pack 61 in the designated circuit pack slot 62. At step 1005, the craftsperson opens the rear door or removes the rear cover from the equipment enclosure. At step 1006, the craftsperson removes the I/O cable connector 31 from the slot in the bulkhead 30 assigned for the designated circuit pack slot 62 without disconnecting the wiring from the I/O cable connector 31. The craftsperson secures the disconnected I/O cable connector 31 to the frame at step 1007, or to nearby cabling or other secure location using a cable tie, in a manner to not interfere with the circuit packs. At step 1008, the craftsperson removes the fan cover from the bank of cooling fans at the front of the equipment enclosure to thereby provide additional work space to perform the fiber optic jumper cable installation.

Figure 4:
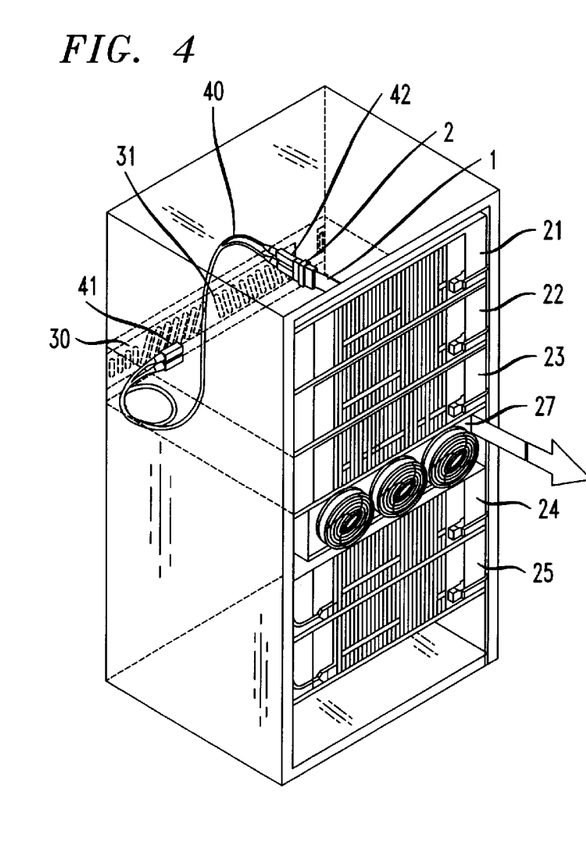
FIG. 4 illustrates a front perspective view of a typical equipment enclosure with the front cover removed therefrom, showing the withdrawal of the fiber optic pass through tool therefrom, with the fiber optic jumper cable connected to the end of the fiber optic pass through tool.
Figure 5A:
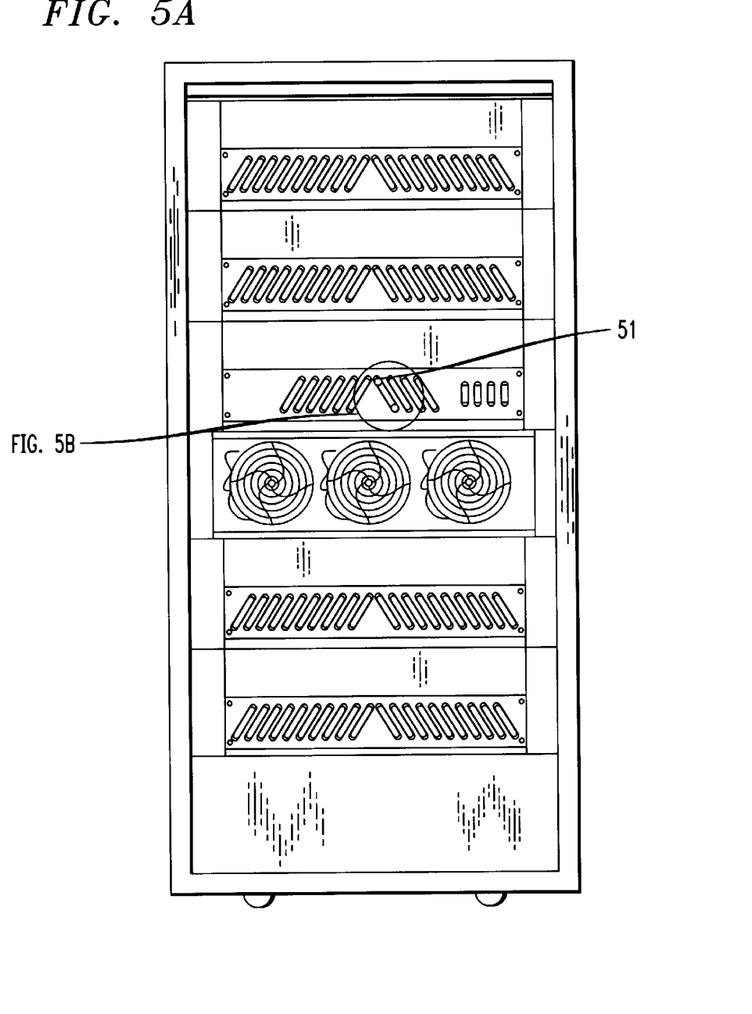
FIGS. 5A and 5B illustrate a rear plan view of a typical equipment enclosure with the rear cover removed therefrom, showing the installation of the fiber optic connector adapter and mounting bracket therein.
Figure 5B:
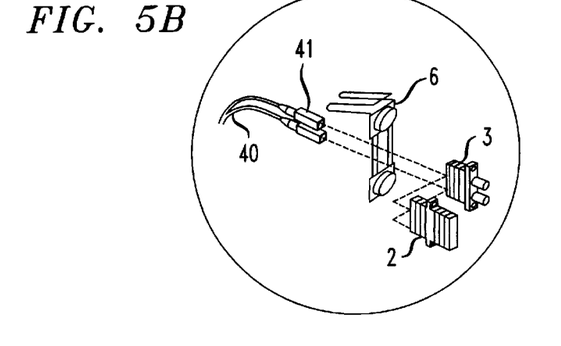
Figure 7:
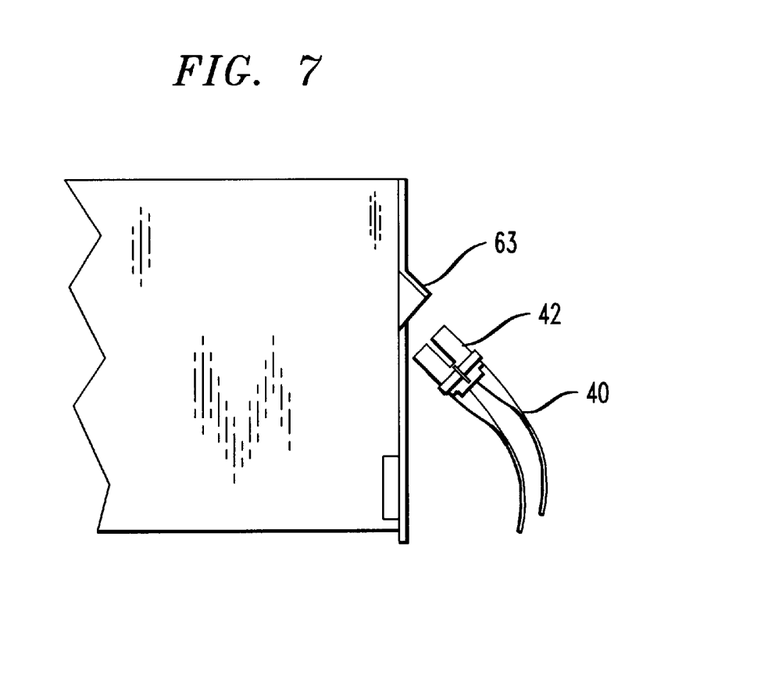
Figure 8:
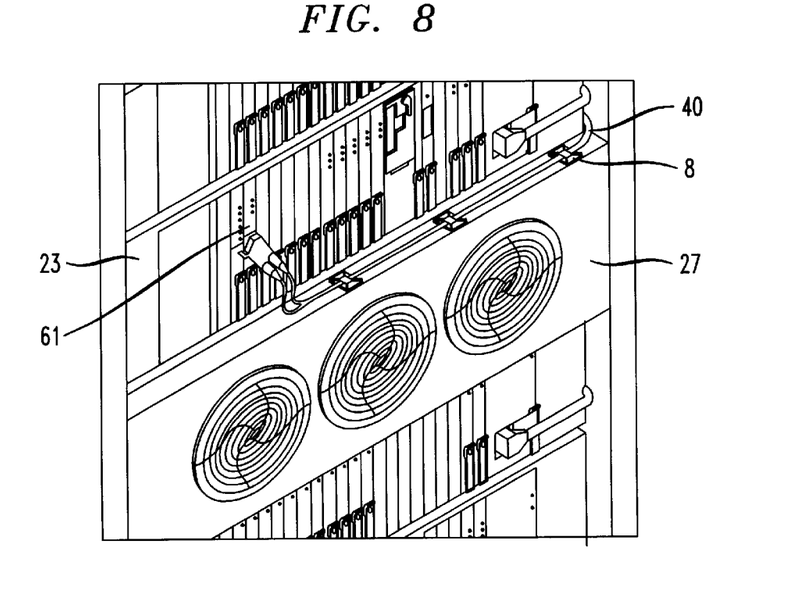
FIG. 8 illustrates a front perspective view of a typical equipment enclosure with the front cover removed therefrom, showing the final installation of the fiber optic jumper cable.
Figure 9:
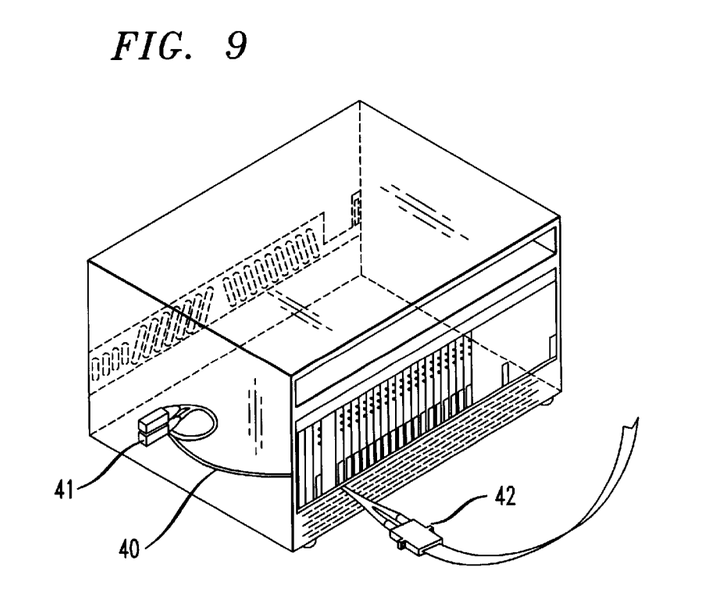
FIG. 9 illustrates a front perspective view of a typical equipment enclosure with the front cover removed therefrom, showing the insertion of the fiber optic pass through tool therein where a single carrier is provided.

The craftsperson snaps the selected one of the hybrid fiber optic connector adapters 2, 3 to the hybrid fiber optic coupling adapter receiver A attached to the end of the extender 1 of the fiber optic pass through tool at step 1009. For example, FIG. 3 illustrates a front perspective view of a typical equipment enclosure 28 with the front cover removed therefrom, showing the insertion of the fiber optic pass through tool therein. (FIG. 9 illustrates a front perspective view of a typical equipment enclosure with the front cover removed therefrom, showing the insertion of the fiber optic pass through tool therein where a single carrier is provided in the equipment enclosure 28.) Once the fiber optic pass through tool is inserted into the equipment enclosure 28, it is extended to the rear of the equipment enclosure 28, hybrid fiber optic coupling adapter end first, at step 1010 to position the selected hybrid fiber optic coupling adapter 2, 3 at the I/O cable connector slot just vacated. The craftsperson at step 1011 then attaches the connector 42 located at one end of the fiber optic jumper cable 4 to the end of the selected hybrid fiber optic coupling adapter 2, 3 and pulls the pass through tool, with the fiber optic jumper cable 4 attached to the hybrid fiber optic coupling adapter 2, 3, back out of the equipment enclosure 28 through the front of the equipment enclosure 28, as illustrated in FIG. 4. At step 1012, the craftsperson routes the end of the fiber optic jumper cable 4 through the opening vacated by the I/O cable connector 31 and disconnects the hybrid fiber optic coupling adapter 2, 3 from both the extender 1 and the connector 42 of the fiber optic jumper cable 4. FIG. 5 illustrates a rear plan view of a typical equipment enclosure 28 with the rear cover removed therefrom, showing the installation of the hybrid fiber optic connector adapter 2, 3 and adapter plate 6 therein. As shown in FIG. 5B, the craftsperson at step 1013 connects the hybrid fiber optic coupling adapter 2, 3 to the connector 41 located at the other end of the fiber optic jumper cable 4 at the rear of the equipment enclosure 28 and snaps the hybrid fiber optic coupling adapter 2, 3 into the I/O connector adapter plate 6. At step 1014, the craftsperson mounts the I/O connector adapter plate 6 in the opening vacated by the I/O cable connector 31 and connects the connector 41 of the fiber optic jumper cable 4 to the I/O connector adapter 2, 3. The craftsperson at step 1015 then closes rear panel of enclosure, replaces the fan cover and connects the connector 42 located at the other end of the fiber optic jumper cable 4 to the angled fiber optic connector 63 located on the front of the fiber optic circuit pack 61. FIG. 6 and FIG. 7 illustrate front plan and side cross-section views of a typical circuit pack carrier 23 and a fiber optic circuit pack 61 mounted therein, showing the insertion of the fiber optic jumper cable 4 therein. Finally, the craftsperson at step 1016 replaced the adjacent circuit pack (if removed) and secures fiber optic jumper cable 4 to the fan cover using cable ties 7 and cable tie mounts 8 as illustrated in FIG. 8.

Adapter Plate

Figure 11A:
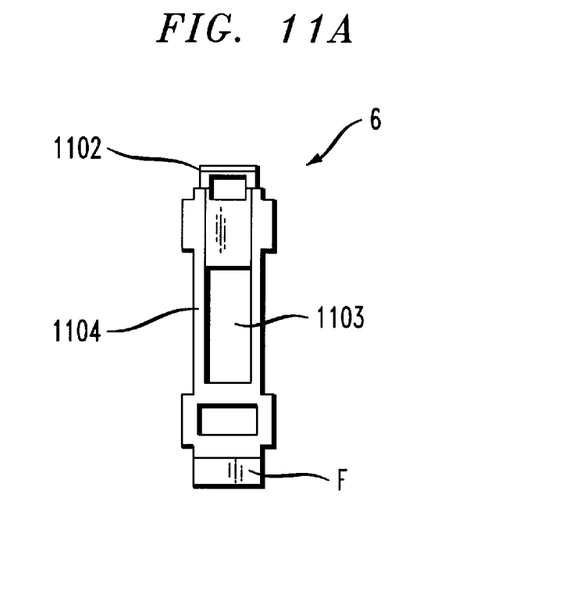
FIGS. 11A and 11B illustrate front plan and side plan views of the adapter plate that is used to secure the fiber optic jumper cable 4 in place.
Figure 11B:
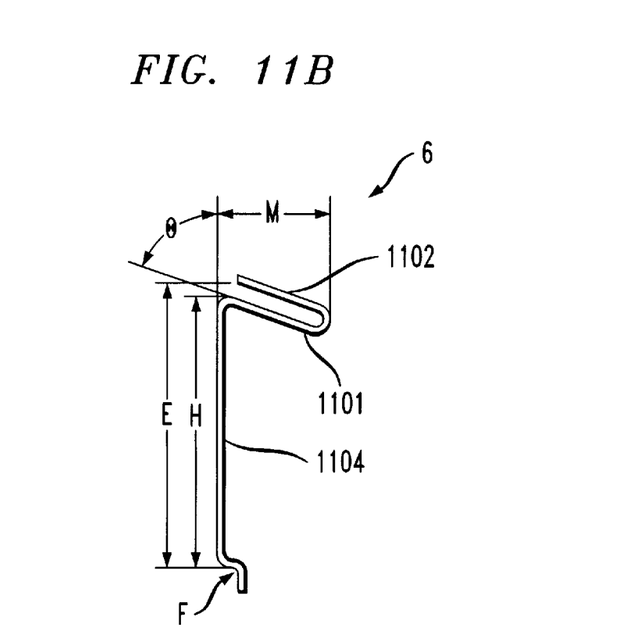

FIGS. 11A and 11B illustrate front plan and side plan views of the adapter plate 6 that is used to secure the fiber optic jumper cable 4 in place. In particular, the adapter plate 6 comprises a fastner-less element that enables the installation of the adapter plate 6 in place without the need to use tools. The adapter plate 6 is preferably manufactured of low cost, carbon steel, such as SAE 1006 type-steel, that is a plain carbon type of steel that has excellent cold formability characteristics. Steel of this type has relatively low tensile values, but these low tensile values are compensated for by the use of a U-shaped end, termed a "hem" 1101, that is formed into the sheet metal. This hem 1101 provides a longer effective moment arm that functions to absorb the deflection of the member 1102.

The adapter plate 6 comprises a body 1104 that is formed to fit into connector hole 31 in the bulkhead 30 and incorporates a number of features that provide that capability without the need for fasteners. The body 1104 includes an aperture 1103 that receives the connectorized end of the fiber optic jumper cable 4. The length H of the flat surface of the adapter plate 6 is sized to nearly fit into the connector hole 31. The U-shaped member 1102 is formed off of an acute angle $\theta$ to length H of the plate 1104 to thereby allow the adapter plate 6 to rotate into position without creating an interference with the end of the U-shaped member 1102. As the lip F located at the bottom of the adapter plate 6 is inserted into the connector hole 31, and the body 1104 rotated about the bottom of the connector hole 31, the U-shaped member 1102 is deflected to enter the connector hole 31, since the overall length E of the adapter plate 6 is greater than the length H of the connector hole 31, until the end of the U-shaped member 1102 clears the bulkhead 30. While this deflection creates a plastic, non-returning deflection of the hem 1101, the length M of the U-shaped member 1102 provides sufficient non-plastic deformation to provide a secure latching of the adapter plate 6 into the connector hole 31 that is formed in the bulkhead 30.

Summary

Thus, the present method and apparatus enables the simple installation of fiber optic jumper cables in an equipment enclosure that is provisioned with traditional wire jumper cables and connectors. The fiber optic pass through tool enables the craftsperson to thread the fiber optic jumper cables through the equipment enclosure with minimal effort and avoids damage to the fiber optic jumper cable, since this tool has an extender of sufficient reach to pull the fiber optic jumper cable through the entire length of the equipment enclosure, with sufficient flexibility to bend the tool around corners, and yet with sufficient stiffness to control the passage of the tool through the equipment enclosure. A hybrid fiber optic coupling adapter is attached in a snap fit manner to the extender and provides a secure means of connecting the fiber optic jumper cable to the extender without the need for fasteners once the fiber optic pass through tool has been threaded through the equipment enclosure. The fiber optic jumper cable can then be pulled back through the equipment enclosure to the front of the fiber optic circuit pack using the fiber optic pass through tool.

What is claimed:

1. Apparatus for installing fiber optic jumper cables in an equipment enclosure that is equipped with a plurality of circuit packs mounted in circuit pack carriers, wherein said circuit packs include at least one fiber optic circuit pack having a fiber optic connector on its front face for receiving a fiber optic connector, comprising:

extender means, having an elongated shape with sufficient reach to pull a fiber optic jumper cable through the entire length of the equipment enclosure, with sufficient flexibility to bend around corners; and fiber optic connector coupler means, removably connectable to said extender means, for receiving a connectorized end of a fiber optic jumper cable.

2. The apparatus of claim 1 further comprising:

means attached to an end of said extender means for removably receiving said fiber optic connector coupler means.

3. The apparatus of claim 2 wherein said extender means comprises:

strip means having a substantially rectangular shape and of sufficient stiffness to control the passage of the fiber optic connector coupler means through the equipment enclosure to a desired location at the back of said equipment enclosure.

4. The apparatus of claim 1 further comprising:

fiber optic jumper cable means comprising a length of optical fiber, terminated at both ends thereof with optical fiber connectors, at least one of said optical fiber connectors being compatible with and connectable to said fiber optic connector coupler means.

5. The apparatus of claim 4 further comprising:

fiber optic connector mounting means affixable to a support member located at a back side of said equipment enclosure for receiving one of said fiber optic connectors and securing same to said support member.

6. The apparatus of claim 5 wherein said fiber optic connector mounting means comprises:

a body having an aperture formed therein for receiving said fiber optic connector coupler means;

lip means formed at a first end of said body for engaging an edge of an aperture formed in said support member; and U-shaped member formed at a second end of said body, opposite said first end and deflectable for enabling said fiber optic connector mounting means to enter and be secured in said aperture formed in said support member.

7. The apparatus of claim 4 further comprising:

fiber optic connector mounting means affixable to a support member located at a back side of said equipment enclosure for receiving said fiber optic connector coupler means and securing same to said support member.

8. The apparatus of claim 7 wherein said fiber optic connector coupler means is operable to receive a one of said fiber optic connectors mounted on said fiber optic jumper cable means.

9. A method for installing fiber optic jumper cables in an equipment enclosure that is equipped with a plurality of circuit packs mounted in circuit pack carriers, wherein said circuit packs include at least one fiber optic circuit pack having a fiber optic connector on its front face for receiving a fiber optic connector, comprising the steps of:

connecting a fiber optic connector coupler to an extender having an elongated shape with sufficient reach to pull a fiber optic jumper cable through the entire length of the equipment enclosure, with sufficient flexibility to bend around corners;

threading said extender, fiber optic connector coupler end first, through said equipment enclosure from a front side of said equipment enclosure to a predetermined location at a back of said equipment enclosure;

attaching a connectorized end of a fiber optic jumper cable to said fiber optic connector coupler that is removably connectable to said extender; and pulling said extender with the attached jumper cable through said equipment enclosure to a front of said equipment enclosure.

10. The method of claim 9, wherein said fiber optic jumper cable comprises a length of optical fiber, terminated at both ends thereof with optical fiber connectors, said method further comprising:

mounting a fiber optic connector adapter plate to a support member located at a back side of said equipment enclosure for receiving one of said fiber optic connectors and securing same to said support member.

\* \* \* \* \*